April 21, 1931.  J. L. DRAKE  1,801,306
METHOD OF TRANSFERRING MOLTEN GLASS FROM TANKS INTO POTS
Filed Aug. 23, 1928
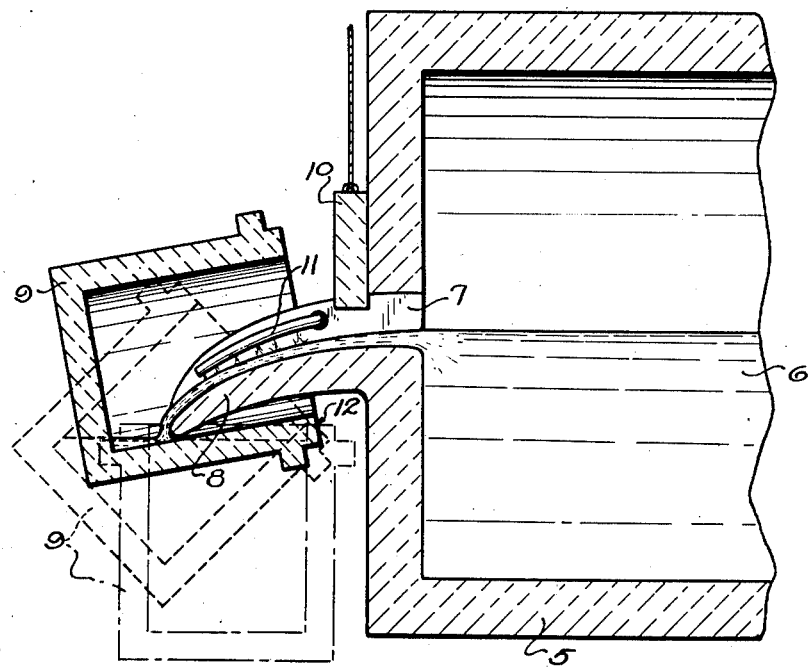
Inventor
John L. Drake.
By Frank Fraser
Attorney Patented Apr. 21, 1931

1,801,306

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD OF TRANSFERRING MOLTEN GLASS FROM TANKS INTO POTS

Application filed August 23, 1928. Serial No. 301,482.

This invention relates to an improved method for transferring or flowing molten glass from a tank into a pot, such as for example where the glass is adapted to be melted within a tank and subsequently refined and settled in a pot prior to being worked.

The principal object of the present invention is the provision of such an improved method wherein the molten glass will be transferred from the tank into the pot in such a manner that it will flow easily and gently thereinto with a minimum amount of splash or fall whereby the glass will not be unduly disturbed, torn or agitated during such transfer. The practice of such a method as herein provided will tend to facilitate and expedite the refining and settling of the glass within the pot.

Other objects and advantages of the invention will become more apparent during the course of the following description when taken in connection with the accompanying drawings, wherein is illustrated a vertical longitudinal section through one form of apparatus by means of which the improved method may be practiced.

Referring to the drawings, there is shown the exit end 5 of a melting tank or furnace of any suitable construction and which is adapted to contain a mass of molten glass 6 preferably produced therein. The front vertical wall of the melting tank 5 is provided with an outlet opening 7 and an outwardly projecting overflow spout or lip 8. The molten glass 6 contained within tank 5 is adapted to flow therefrom through the outlet opening 7 and down the spout 8 into the pot 9 in a manner to be fully hereinafter described. The flow of molten glass from the tank may be regulated by means of a vertically adjustable gate or the like 10 while the temperature of the molten glass within the spout may be controlled by means of burners or other heating means 11. The present invention is of course not limited to the particular apparatus disclosed since the improved method may be practiced with other forms of apparatus.

The pot 9 is preferably circular in construction and as shown is of such a size that the spout or lip 8 may be received therein. In the practice of the improved method contemplated by the present invention, the pot is first placed in telescoping relation to the overflow spout 8 as indicated by the full lines in the drawings. That is, the pot is initially positioned so that the overflow spout is received therein in such a manner that its outer end terminates closely adjacent one wall thereof and as shown adjacent the side wall although by changing the shape and dimensions of the pot and spout, the said spout may terminate more closely adjacent the bottom of the pot if desired. When so positioned the pot is inclined slightly at an angle to the horizontal. The flow of molten glass 6 is then started from the tank 5 and it will be apparent that the glass will flow into the pot in its initial position with a minimum amount of splash or fall. Simultaneously with the flowing of the glass into the pot, the pot is gradually lowered relative to the spout through an arcuate path, the pivot point or axis about which the said pot is turned being located substantially at the point designated 12. Otherwise stated, the pot is lowered through an arcuate path relative to the spout about a substantially horizontal axis extending at or near that portion of the upper edge of the pot beneath said spout. As the pot is lowered to a substantially vertical position it will be gradually filled with molten glass. In this manner, the glass will flow into the pot easily and gently with very little fall so that minimum disturbance of the glass should result. By passing the glass from the tank into the pot so that it will not be unduly disturbed, torn or agitated during such transfer should greatly facilitate and expedite the refining and settling operation which the glass is subjected to within the pot prior to being worked.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of passing molten glass from a tank having an outwardly projecting overflow spout into a pot, which consists in telescoping the pot and spout in a substantially horizontal plane, moving the pot relative to said spout into a substantially vertical position, in simultaneously flowing the molten glass from said tank into said pot, and in preventing the flow of glass from said pot during movement thereof.

2. The method of passing molten glass from a tank having an outwardly projecting overflow spout into a pot, which consists in initially positioning the pot so that the spout is received therein with its outer end terminating closely adjacent one wall thereof, moving the pot relative to said spout into a substantially vertical position, in simultaneously flowing the molten glass from said tank into said pot, and in preventing the flow of glass from said pot during movement thereof.

3. The method of passing molten glass from a tank having an outwardly projecting overflow spout into a pot, which consists in telescoping the pot and spout, gradually lowering the pot relative to said spout in a vertical plane, in simultaneously flowing the molten glass from said tank into said pot, while preventing the flow of glass from said pot.

4. The method of passing molten glass from a tank having an outwardly projecting overflow spout into a pot, which consists in initially positioning the pot so that the spout is received therein with its outer end terminating closely adjacent one wall thereof, gradually lowering the pot relative to said spout until said pot assumes a substantially vertical position, in simultaneously flowing the molten glass from said tank into said pot, and in preventing the flow of glass from said pot during movement thereof.

5. The method of passing molten glass from a tank having an outwardly projecting overflow spout into a pot, which consists in telescoping the pot and spout, gradually lowering the pot through an arcuate path relative to said spout, in simultaneously flowing the molten glass from said tank into said pot, and in preventing the flow of glass from said pot during movement thereof.

6. The method of passing molten glass from a tank having an outwardly projecting overflow spout into a pot, which consists in initially positioning the pot so that the spout is received therein with its outer end terminating closely adjacent one wall thereof, gradually lowering the pot through an arcuate path relative to said spout, in simultaneously flowing the molten glass from said tank into said pot, and in preventing the flow of glass from said pot during movement thereof.

7. The method of passing molten glass from a tank having an outwardly projecting overflow spout into a pot, which consists in telescoping the pot and spout, lowering the pot through an arcuate path relative to said spout about a substantially horizontal axis extending at or near that portion of the upper edge of the pot beneath said spout, in simultaneously flowing the molten glass from said tank into said pot, and in preventing the flow of glass from said pot during movement thereof.

8. The method of passing molten glass from a tank having an outwardly projecting overflow spout into a pot, which consists in initially positioning the pot so that the spout is received therein with its outer end terminating closely adjacent one wall thereof, lowering the pot through an arcuate path relative to said spout about a substantially horizontal axis extending at or near that portion of the upper edge of the pot beneath the spout, in simultaneously flowing the molten glass from said tank into said pot, and in preventing the flow of glass from said pot during movement thereof.

9. The method of passing molten glass from a tank having an outwardly projecting overflow spout into a pot, which consists in initially positioning the pot in a substantially horizontal plane so that the spout is received therein with its outer end terminating closely adjacent one wall and an end thereof, gradually lowering the pot downwardly through an arcuate path until said pot assumes a substantially vertical position relative to said spout, in simultaneously flowing the molten glass from said tank into said pot, and in preventing the flow of glass from said pot during movement thereof.

Signed at Toledo, in the county of Lucas and State of Ohio, this 17th day of August, 1928.

JOHN L. DRAKE.